Feb. 19, 1946.   S. M. DOCKERTY   2,395,371
CRIMPED FIBROUS GLASS
Original Filed Sept. 12, 1939

Inventor
S. M. Dockerty

Patented Feb. 19, 1946

2,395,371

UNITED STATES PATENT OFFICE 2,395,371

CRIMPED FIBROUS GLASS

Stuart M. Dockerty, Pawtucket, R. I., assignor to Owens-Corning Fiberglas Corporation, a corporation of Delaware Original application September 12, 1939, Serial No. 294,487. Divided and this application December 4, 1942, Serial No. 468,171

2 Claims. (Cl. 28—78)

The present invention relates to a fibrous product, and in particular to novel crimped glass fibers and tangled or felted mats of crimped fibrous glass.

This application is a division of my copending application, Serial No. 294,487, filed September 12, 1939, now Patent No. 2,313,630, dated March 9, 1943.

Undulated, wavy or crimped glass fibers of the type previously produced have been difficult to permanently entangle or felt for the reason that the undulations of the individual fibers were not of a character that permitted them to interlock with the undulations of adjacent strands or fibers and remain locked thereto permanently. Undulations heretofore produced generally were of the character of a sine curve and could generally be pulled from one another so that the product had neither the cohesion nor the mass integrity in any direction desired for some applications.

It is the object of the present invention to provide crimped glass fibers provided with actual loops as distinguished from mere undulations. The loops close about one another when the fibers are collected in a mass and retain their form permanently so that the loops cannot readily be separated. This results in a product in which the fibers are definitely interlocked with one another and an exceptionally good degree of cohesion is attained.

Other objects not at this time enumerated will become apparent as the nature of the invention is better understood.

Briefly, the present invention contemplates the attenuation of fibrous glass streams by suitable means such as the coaction of a revolving or otherwise moving means and a gaseous jet adapted to direct the streams under the influence of such means to attenuate the same so as to crimp the streams into wavy fibrous form of sinuous configuration. While the glass fiber is sufficiently hot to be plastic it is projected into a relatively quiescent atmosphere whereupon the preformed undulations in the fibers are transformed into partially closed loops which are capable of encircling one another to produce a mass of glass wool in which a relatively high percentage of interlocking between loops is effected.

Figure 1:
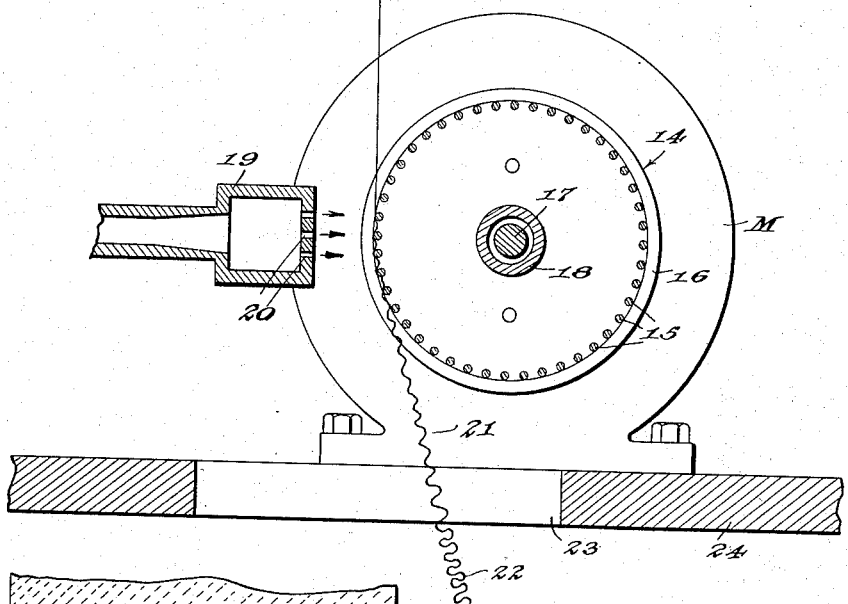
Figure 1 is a sectional view, partially diagrammatic in its representation, of an exemplifying apparatus for producing the fibrous glass of the present invention.
Figure 2:
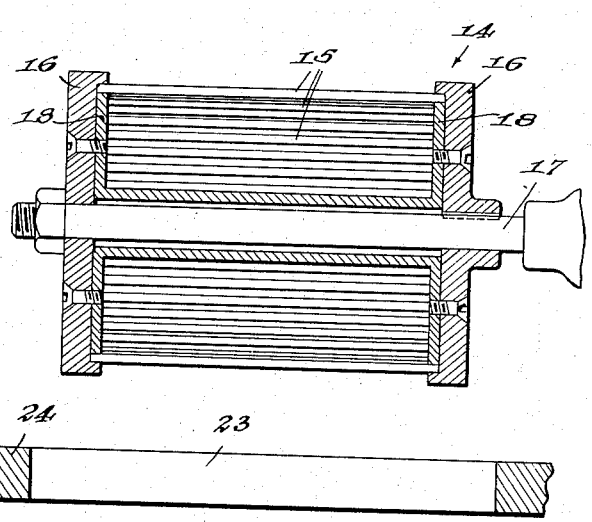
Figure 2 is a vertical sectional view taken transversely of Figure 1.

Referring now to Figures 1 and 2, the reference character 10 designates a glass feeding apparatus which may be of the type shown in the United States Patent No. 2,165,318. The feeder 10 includes a series of orifices 11 from which streams 12 of glass issue continuously. The temperature of the streams 12 as they emerge from the feeder may, if desired, be regulated by means of blowers 13 positioned beneath the orifices 11 in a manner similar to that disclosed in the Slayter and Thomas Patent No. 2,234,986. The blowers 13 may or may not be used according to the type of stream desired.

Spaced below the feeder 10 and positioned substantially tangential to the streams 12 issuing from the former is an irregular cylindrical surface or crimping drum 14 which is preferably of "squirrel cage" design and consists of a series of parallel crimping bars 15 arranged in cylindrical fashion and having their ends anchored in end plates 16 mounted on a central shaft 17. A spool-shaped spacing member 18 surrounds the shaft 17 and has its ends secured to the end plates 16. Any suitable means may be utilized for rotating the crimping drum 14, and as shown in Figure 1, an electric motor M is adaptable for this purpose.

The streams or fibers 12 of glass issuing from the orifices 11 are directed tangentially against the crimping drum 14 by means of continuous lateral blasts of air issuing from a blower 19 through one or a plurality of superimposed series of jets 20 spaced apart a distance which will cause the blasts issuing therefrom to be directed simultaneously toward two or more adjacent interstices to crimp the streams or fibers 12 therein or at least to cause the streams to bear against the drum in such a manner that the frictional engagement between the drum and fibers will be sufficient to cause a definite gripping of the fibers to attenuate the streams issuing from the orifices 11.

The blowers 13 may be regulated to permit the fibers 12 to arrive at the crimping drum in a relatively hot state. In this instance, because the crimping drum 14 is rotating at relatively high speed, the relatively hot fibers 12 are crimped and thrown out tangentially of the drum by centrifugal force as indicated at 21. Inasmuch as the blasts are directed simultaneously into adjacent interstices in the drum 14, successive crimps formed by a single jet do not neutralize each other by taking up the slack of one another.

The crimped fibers shown at 21 are generally of sinuous wavy configuration inasmuch as this is the form imparted to them while they are operated upon by the blasts of air which force them against the moving crimping bars 15. If, however, the fibers as they leave the bars 15 have sufficiently low viscosity due to heat, a further crimping action may take place. Because of the high rate of surface speed of the drum 14, the fibers as they are thrown tangentially therefrom move longitudinally of themselves at terrific speeds in the neighborhood of from 4,000 to 50,000 feet per minute although other speeds may be employed. At these high speeds when the fibers have moved out of the range of air disturbance caused by rotation of the drum and/or the air disturbance caused by the blasts issuing from the blower 19 and have moved into a region of comparatively quiescent air, they bump or telescope, so to speak, into the quiescent air, are decelerated and pile up on each other to a certain extent so that loops 22 are formed. As the fibers are collected haphazardly in the form of bulk fibrous glass, some of these loops close about one another to a certain extent to form a partially felted body of wool that has tenacity or coherence in all directions.

The crimped fibers 21 may be passed through an opening 23 provided in a table 24 upon which for convenience the motor M may be mounted.

Figure 3:
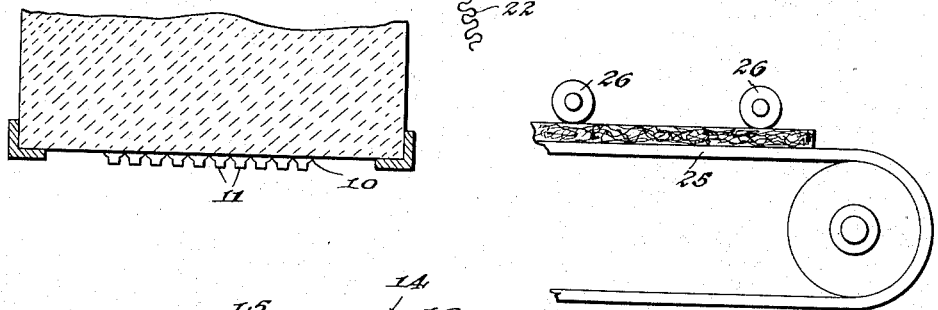
Figure 3 is a diagrammatic view of a forming apparatus by means of which the crimped glass fibers are formed into a mat.

The crimped fibrous glass may be collected as it is formed upon a continuously moving surface or conveyor 25 (Figure 3). Interfelting of the crimped fibers may be further enhanced by means of rollers 26 which operate upon the fibrous material to cause these so-called closed loops to penetrate one another and hook onto one another to produce a matted product that possesses exceptional tenacity in all directions and which, in order to be separated, must actually be pulled or torn apart. The rolls 26 may be driven in such a manner as to facilitate passage of the matted product therebeneath and also, if desired, they may be reciprocated longitudinally in order that the material may be thoroughly worked to produce a maximum amount of interfelting. A number of felting procedures are shown in the Slayter Patent No. 2,206,059, dated July 2, 1940.

The invention is not to be limited to production by the exact apparatus shown in the drawing or described in this specification as various other means may be employed to form the plastic glass streams into wavy configuration and project the fibers thus formed into relatively quiescent atmosphere to cause the undulations to increase in magnitude in accordance with the present invention. Moreover, the illustration of the fibers, especially as they are being crimped is diagrammatic since it is almost impossible to depict these fibers as they move at such great speeds. It should be noted, however, that the crimps are irregular and not uniform, which is a decided advantage in obtaining good felting characteristics.

Modifications and variations may be resorted to within the spirit and scope of the invention as defined in the appended claims.

I claim:

1. A product of manufacture comprising a mat of fibrous glass having the fibers thereof haphazardly arranged and provided throughout their lengths with contiguous alternate inverse and reverse undulations, said undulations being irregular and nonuniform with a substantial number of the undulations being in the form of loops exceeding a semi-circle in magnitude, the undulations being all of substantially the same size, the undulations of adjacent fibers in the mat being interlocked to provide substantial tensile strength of the mat in all directions.

2. As a product of manufacture, a body of matted haphazardly arranged glass fibers, each of said fibers being provided throughout its length with contiguous alternate inverse and reverse undulations, said undulations being irregular and nonuniform but being all of substantially the same size, a substantial number of said undulations being in the form of loops exceeding a semi-circle in magnitude.

STUART M. DOCKERTY.